United States Patent Office 2,879,735
Patented Mar. 31, 1959

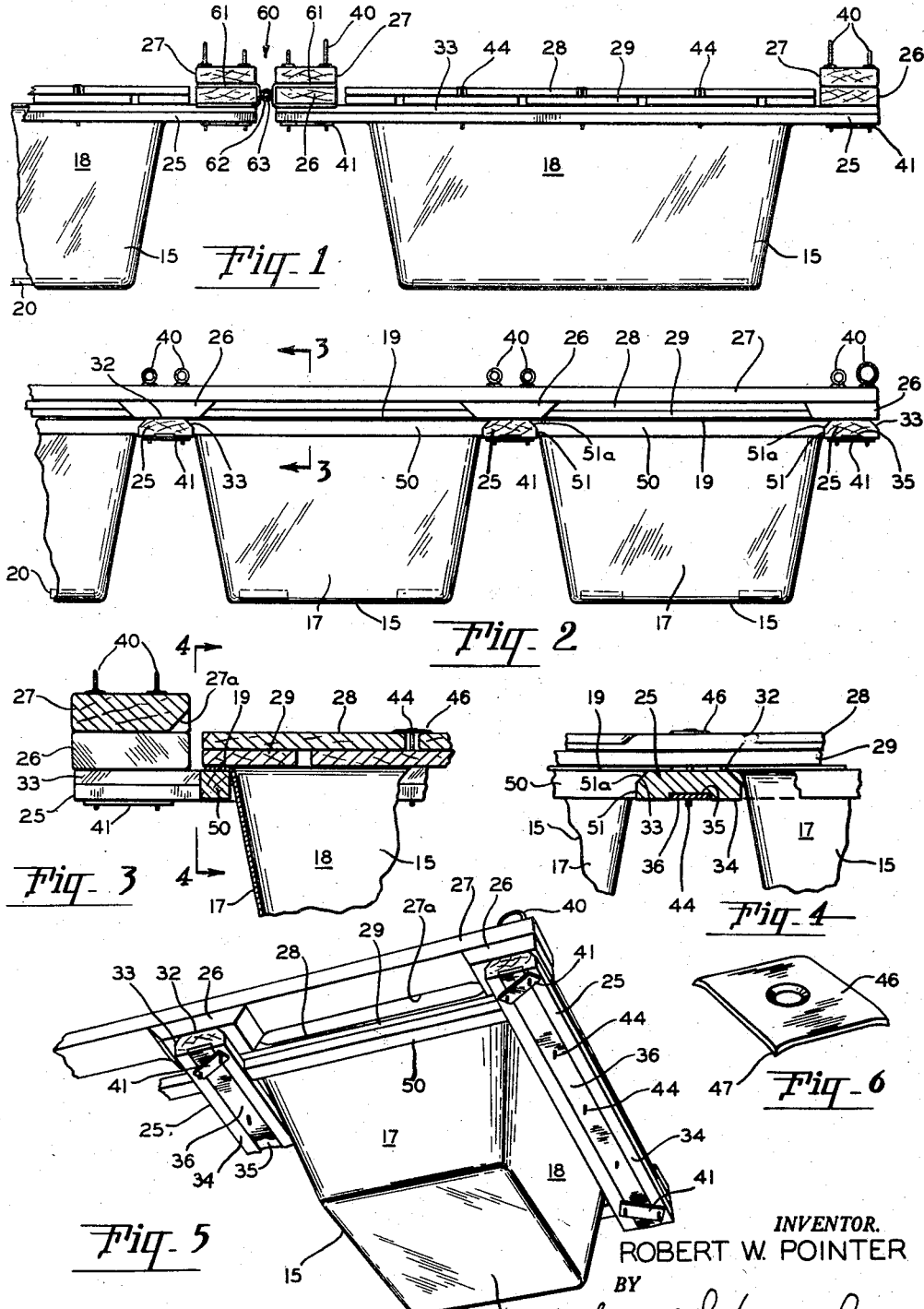

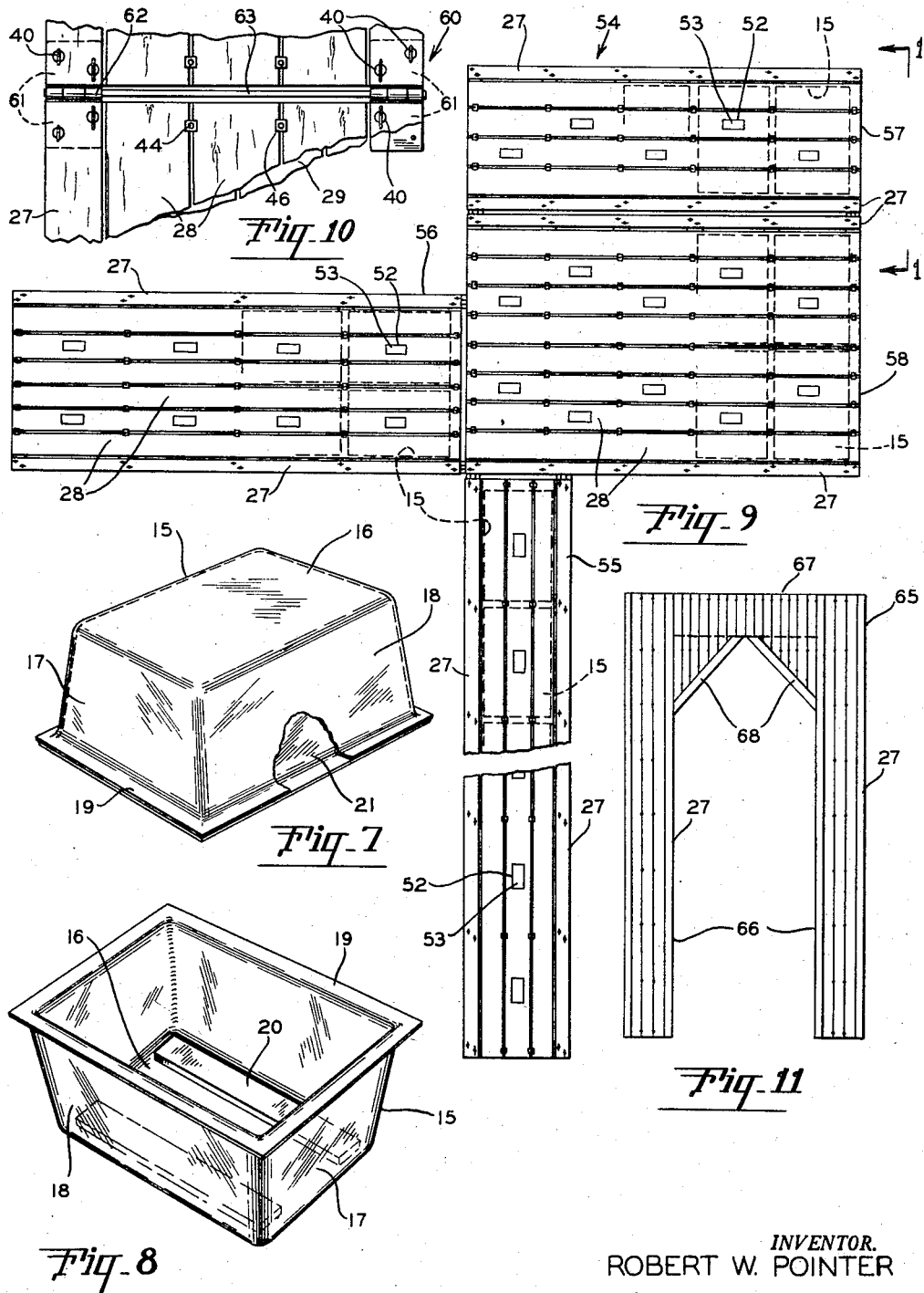

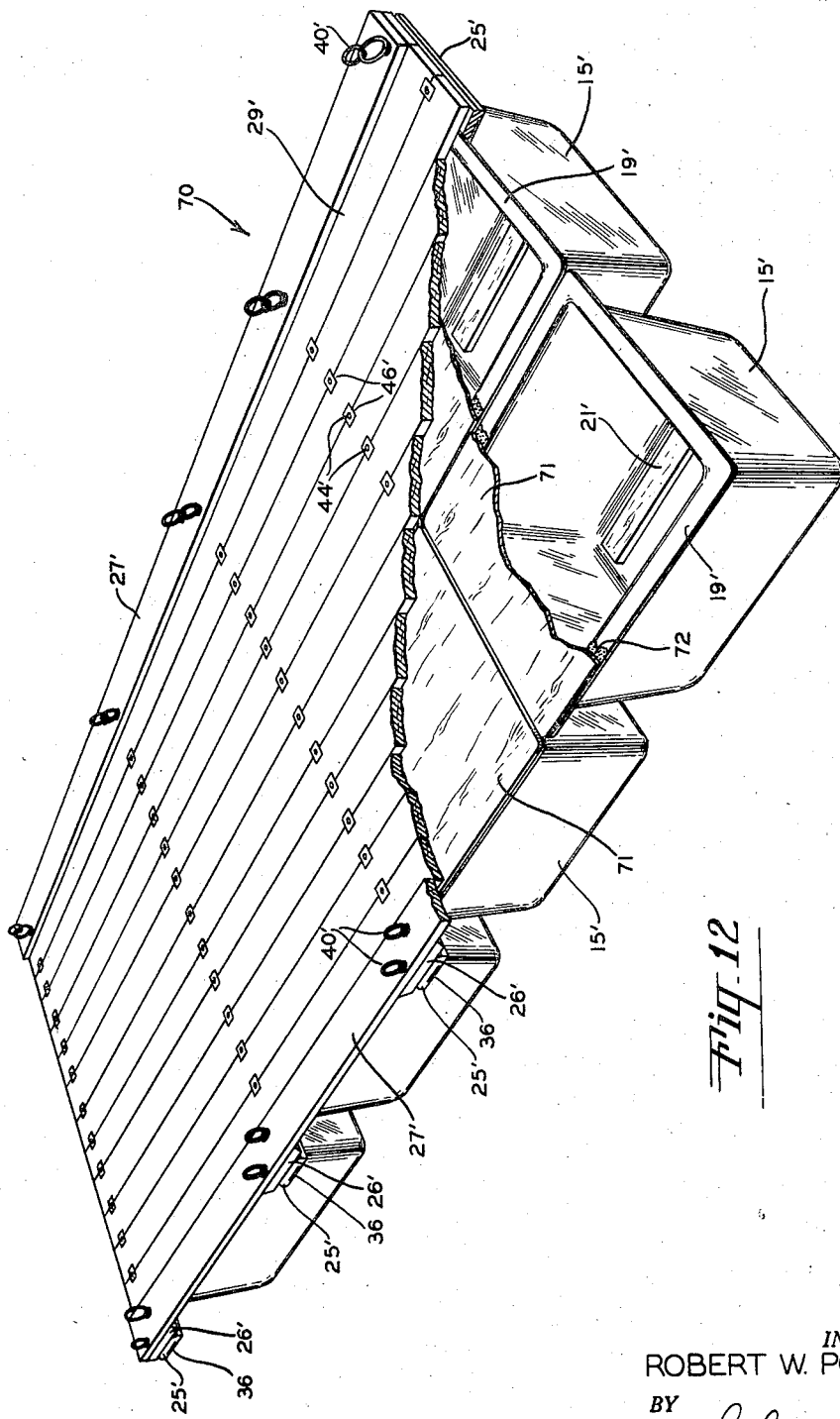

2,879,735

MARINE FLOAT

Robert William Pointer, Portland, Oreg.

Application April 25, 1955, Serial No. 503,659

11 Claims. (Cl. 114—.5)

This invention relates to marine floats and more particularly to buoyant structures comprising floating docks, work platforms, swimming floats, boat houses, and the like.

Conventional marine floats, such as floating docks, platforms and the like, usually utilize large logs or metal drums for flotation members, making them subject to water logging or corrosion in a short time. Installation and repair are costly and difficult and dismantling in the winter is usually out of the question. Since the large and heavy members cannot be shipped economically, the construction usually must be improvised from available materials close at hand, but in some localities the necessary components cannot be obtained.

An important object of the invention is to provide a marine float having improved deck structure and improved flotation units therefor.

A further object is to provide a deck structure for a marine float having improved means for attachment to flotation units and having improved structure for substantially sealing said units against the inflow of rain water or wave water.

A further object is to provide individual docks or platforms which are adapted to be hingedly connected together at the side or end edges whereby a composite float may be assembled to assume variable sizes and shapes.

A further object is to provide a marine float having a large number of small flotation units which are easy to make in quantity and which will nest compactly for shipment.

A further object is to provide a novel form of flotation unit to replace logs or drums which may have become unfit for further service in a conventional structure.

Further objects are to provide a marine float which is inexpensive and simple in structure and easy to assemble and take apart; which has improved means for the removal and replacement of open top flotation units to facilitate maintenance and repair; which is light in weight; and which is rugged and durable in use.

Still further objects are to provide an improved flotation unit for marine floats preferably molded of a light weight material, such as a polyester resin plastic; to provide a flotation unit which can itself be used as a mold for subsequent forming of additional units; and to provide a flotation unit having buoyant means secured therein to prevent sinking of said unit in the event the unit is filled with water.

The foregoing objects are achieved by a novel deck structure and flotation units therefor which form in combination a marine float adapted for the various purposes described. The flotation units are molded from plastic and have sloping sides and an open top, these units being formed preferably from a polyester resin plastic and having the advantage that they may be molded upon a previously molded unit of the same structure. The deck structure, besides affording a top surface for the float, also serves as a cover for the open top flotation units. The float may comprise individual platforms which may be of different sizes and shapes and which are preferably hingedly connected at their side or end edges, whereby the float structure as a whole can be extended in different directions to form piers, walkways, boat houses and the like. In a modified form of the invention there is provided sealed flotation units which may be utilized as individual units to replace unfit conventional flotation units, such as logs or drums, or which may be arranged to support decking in a novel dock or platform arrangement.

The invention will be better understood and additional objects and advantages will become apparent from the following description taken in connection with the accompanying drawings which illustrate preferred forms of the invention. It is to be understood, however, that the invention may take still other forms, and that all such modifications and variations within the scope of the appended claims which will occur to persons skilled in the art are included in the invention.

In the drawings:

Figure 1 is a partial end elevational view of a marine float, showing some of the details of structure and a preferred form of attaching two individual platform units, taken on the line 1—1 of Figure 9;

Figure 2 is a partial side elevational view of a platform unit;

Figure 3 is a sectional view, taken on the line 3—3 of Figure 2;

Figure 4 is a sectional view, showing in detail the manner of attaching the deck structure to the flotation units, taken on the line 4—4 of Figure 3;

Figure 5 is a perspective view of the underside of one end of a platform unit showing a flotation unit attached thereto;

Figure 6 is a perspective view of a washer used to hold deck planking in place;

Figure 7 is a perspective view showing the method of making the flotation units;

Figure 8 is a perspective view of a flotation unit;

Figure 9 is a plan view of a marine float formed from a plurality of individual platform units in hinged relationship;

Figure 10 is a fragmentary plan view showing a hinged joint for connecting a pair of the platform units;

Figure 11 is a plan view showing a plurality of individual units secured together to form a U-shaped float for a boat house; and Figure 12 is a perspective view showing a modified form of platform structure and flotation unit therefor, portions being broken away.

Referring first to Figure 8, the present marine float construction utilizes flotation units such as tanks or pontoons 15 having a bottom wall 16 and sloping end and side walls 17 and 18, respectively. The pontoons, when formed, have an open top and are provided with an outwardly projecting peripheral flange 19 around the upper edge thereof. These structures may be formed of a number of substances but in their preferred form are molded from a reinforced plastic, such as fiber glass and polyester resin, in order to provide the desired durability and light weight. The plastic material has a specific gravity heavier than water and, in order to prevent the pontoons from sinking if they should be filled with water while being installed or removed, a pair of strips 20 of balsa wood, or other light specific gravity material, are secured interiorly to the bottom wall 16.

A preferred method of fabricating the plastic pontoons comprises first laying a tailored piece of glass cloth on an appropriate male mold and then impregnating the cloth with a polyester resin. After the resin has dried, glass matting is applied and then another layer of glass cloth is applied. The layers of glass cloth and matting are completely saturated with the polyester resin and the composition is then allowed to set at room temperature or higher until partially cured and rigid. The pontoon may then be removed from the mold for completion of the curing process. Adhesion is prevented by an application of a suitable parting agent to the mold, such as a hard coat of water base wax or methyl cellulose. The balsa wood strips 20 are painted with resin and placed in the bottoms of the pontoons as shown in Figure 8. The resin water-proofs and preserves the wood and bonds it to the plastic pontoon. The pontoon may also be hot press molded and, if desired, may be molded without the glass cloth layer therein, using only the glass matting for strength.

An important feature of the invention is that the individual pontoons, once molded and cured, can themselves be used as molds and there is, therefore, obviated the necessity of costly molds or presses. Referring to Figure 7, there is shown a mold 21 upon which a pontoon 15 has been formed, the mold 21 comprising one of the pontoons 15 previously molded. It is, of course, necessary to start initially with a wood mold or the like, but thereafter the molded plastic products can themselves be used as the molds.

A further feature of the molded devices is that by reason of the tapered construction they can be nested within each other to facilitate handling thereof and to conserve space while in storage or shipment. In addition, the tapered structure of the devices is effective to resist damage thereto in that when they are installed in a platform supporting position the inclined walls tend to deflect any blows caused by articles moving with the current. Also, in the event that ice forms on the water, the ice, rather than crushing the pontoons, will be deflected downwardly, tending to lift the pontoons.

The tanks or pontoons 15 are used in combination with a novel deck structure, Figures 1–6, comprising in general transverse bars or cleats 25, spacer blocks 26 supported thereon, longitudinal rails 27 on the spacer blocks, and an upper and lower layer of deck planking 28 and 29, respectively. Bars 25 are preferably wood and assume the shape in cross section shown particularly in Figure 4. Each of the bars 25 has a flat top surface 32, bevelled along longitudinal side edges at 33, and a flat bottom surface 34 provided with a longitudinal central groove 35 adapted to receive an elongated clamp plate 36 which is secured to the bar by screws. As best seen in Figures 2 and 4, with the platform in assembled relation, the bars 25 are disposed between the pontoons 15, and the top surface 32 thereof engages the bottom surface of the flanges 19 on the pontoons, the bevelled portion 33 being disposed in the corners between the side walls and flanges of the pontoons to form guideways for inserting and removing the pontoons.

Spacer blocks 26 are mounted flush with the ends of bars 25, and the longitudinal rails 27 are secured on said blocks by means of eye bolts 40 which extend through bores in the rails 27, blocks 26 and members 25, and which are threaded in tapped bores in auxiliary clamp plates 41. The bolts 40 comprise tie or lifting rings and may be of different sizes to accommodate various size lines for holding the platform in a predetermined anchored position or for attachment of crane lines if the platform is to be lifted, the metal plates 41 insuring a positive anchoring of the bolts 40 in relation to the wood bars 25. The platform may also be anchored by means of a rope tied around rails 27 between the spacer blocks 26, and to prevent damage to the rope the rails have beveled portions 27a, Figure 3.

Deck planking 29 is supported directly on the top surface of flanges 19 of the pontoons and the planking 28 is supported on the planking 29, with longitudinal joints between the two layers being staggered as shown in Figure 3. The layers of planking 28 and 29 are held firmly in engagement with the pontoons by a plurality of screws 44 which threadedly engage tapped holes in the plate 36. Screws 44 are provided with enlarged washers 46, Figure 6, which are of sufficient dimension to span the space between the planking and which have downwardly projecting corner portions 47 to form prongs engageable with the wood planking for anchoring the washers in non-rotative position. Screws 44 clamp the planks 28 and 29 firmly together at the joints so that rain water or wave action cannot seep through the joints into the pontoons. The screws 44 also prevent buckling of the wood planks upon change in moisture conditions, the planks being spaced apart sufficiently to allow for the normal swelling of the wood.

To support the ends of the pontoons 15, the deck structure is provided with bars 50 supported and clamped between the spaced bars 25. The bars 50 have end edges formed with a straight lower portion 51 and an outwardly inclined upper portion 51a for conforming to the side contour of the bars 25. Bars 50 are mounted in place by moving them sideways over the ends of the bars 25, and are positioned to engage the bottom surface of flanges 19 to provide lateral reinforcement for the pontoons between the bars 25.

The bars 25 and 50 and the planking 28 and 29 render the floats substantially water tight, but as there may be a small amount of moisture which finds its way into the interior of the pontoons, the deck planking has openings 52 over each of the pontoons for removing the water, such as by means of a bilge pump, the openings 52 being closed by suitable covers 53. The plastic material used to mold the present pontoons is transparent and it can be readily determined by observation if any water has seeped into the pontoons.

In addition to the advantages of the pontoons pointed out hereinabove, there is the important feature that they are light in weight to assist in handling and are permanent in nature, being resistant to marine action or electrolysis. The pontoons are of a suitable size to be handled by a single workman for assembly or disassembly, or for repair of the platform. Individual pontoons can be removed from the platform by first removing one end bar 50, loosening screws 44 and bolts 40 in the immediate area and then sliding the pontoon over one end of the bars 25. A new pontoon can be readily installed by reversing this procedure.

Individual pontoons 15 may be replaced by one man in a very short time by using merely a wrench and screwdriver. If a pontoon has become damaged, the water therein reduces its buoyancy and very little upward frictional force is thus exerted against the deck planking to resist movement of the pontoon along the bars 25. When installing a new pontoon, it may be partially filled with water to submerge it a desired amount so that the flanges 19 will be aligned with and move freely along the top edges of bars 25. The pontoon cannot sink because of the buoyant strips 20, and there is thus no danger of losing it if it should accidentally become completely filled with water when being installed.

Individual platform units may assume different shapes and sizes by arranging the pontoons 15 in various combinations. For example, Figure 9 shows a marine float 54 comprising a plurality of individual platform units 55, 56, 57 and 58 and each of these units has a different arrangement of pontoons. Unit 55 comprises a plurality of pontoons mounted in end to end relation. Unit 56 comprises a double row of pontoons spaced in end to end relation. Unit 57 comprises a single row of pontoons disposed in side by side relation, and unit 58 comprises a double row disposed in side by side relation. Various other combinations and arrangements may be made as the need arises and the illustrated examples are to be considered as illustrating rather than as limiting the invention.

The individual units in a platform assembly may be attached together in various ways but a preferred manner of attachment is to pivot them together along the juncture by means of a hinge 60, best shown in Figures 1 and 10. The hinge 60 comprises a pair of U-shaped straps 61 having eye portions 62 pivoted on a pin 63. Referring to Figure 1, the legs of the U-shaped straps 61 engage upper and lower surfaces of spacer blocks 26 and are held securely in place by the bolts 40 extending through suitable apertures therein. For attaching a unit to the end of another unit where a spacer block 26 is not available, the hinge straps may be secured to the deck planking in any suitable manner.

By attaching the platform units in various combinations, structures of desired shapes can be assembled, such as floating docks, work platforms, swimming floats, and the like. Figure 11 shows an assembly of units comprising a floating base 65 for a boat house, or the like. In this arrangement, a pair of elongated units 66 are secured in parallel relation at one end by a transverse unit 67, triangular webs 68 being provided at the juncture of the unit to reinforce the structure. The pontoons used therewith may be arranged in end to end or side by side position as desired.

The pontoons 15, being light in weight, displace a small amount of water and are exceedingly stable for supporting various loads. If one portion of the platform is to sustain a heavier load than other portions, the pontoons under the lighter portion may be partially filled with water or sand as ballast to level the platform. The platform units may be provided with suitable guard rails to prevent users of the platform from falling overboard, and any other equipment desired.

Referring now to Figure 12, there is shown a marine float structure 70 which utilizes pontoon units 15' having covers 71, the pontoon units 15' being of the same structure as the pontoons 15 except for the covers thereon and having top flanges 19', buoyant strips 21', and being formed from a reinforced plastic. As shown, the covers 71 assume approximately the same dimension as the flanges 19' and are constructed of a suitable material such as wood or plastic, a preferred cover comprising a resin coated plywood. The cover is preferably secured to the flange 19' by a suitable adhesive, such as resin, although it may be affixed by bolts or other means, and gaskets 72 may be provided between the cover 71 and the flanges 19' to provide a positive water-tight seal for the pontoons.

The pontoons 15' are especially adaptable for replacing conventional flotation means, such as drums or logs, which have been damaged or otherwise have become non-buoyant. As stated, the covers 71 of the pontoons are preferably of wooden construction whereby the pontoons are merely nailed or screwed into the desired location under the platform or structure to be supported.

In a platform structure utilizing the covered pontoons 15' a single layer of planking 29' is sufficient. Aside from this feature, the structure of the platform is similar to the platforms hereinbefore described and employs cross pieces 25', spacer blocks 26', longitudinal rails 27', eye bolts 40', and screws 44' for holding the parts in assembled relation. The screws 44' extend between the planks 29' and floats 15' and threadedly engage clamping plates 36 on the bottom of cross pieces 25', no bore holes being necessary in the planking for inserting the screws 44'. Enlarged washers 46' are used with the screws 44' for spanning the gap between planks 29'.

The platform of Figure 12 may be hingedly connected to other platform sections, as hereinbefore described, to form floating structures of various sizes and shapes.

Having now described my invention and in what manner the same may be used, what I claim as new and desire to protect by Letters Patent is:

1. A marine float comprising a platform, a plurality of spaced parallel cleats on the bottom of said platform, and a plurality of rows of rectangular flat top pontoons between pairs of said cleats having rim flanges clamped against the bottom of said platform by said cleats.

2. A marine float comprising deck planking, spaced parallel cleats on the bottom of said planking, and a plurality of rows of rectangular flat top pontoons between pairs of said cleats and secured by said cleats against the bottom of said planking in substantially edge to edge relation across the length and width of the whole area of said planking.

3. A marine float comprising a deck, spaced parallel guideways on the under side of said deck, and rectangular flat top pontoons having rim flanges slidable in said guideways, said pontoons being disposed in rows between pairs of said guideways substantially in abutting relation across the length and width of the whole area of said deck.

4. A marine float comprising deck planking, spaced parallel cleats on the bottom of said planking, the upper corners of said cleats being recessed to form guideways on opposite sides of each cleat, and a plurality of rows of rectangular flat top pontoons between pairs of said cleats having rim flanges in said guideways engaging said planking.

5. A marine float comprising a platform of planking, a plurality of spaced parallel cleats on the bottom of said platform having recessed upper edges forming guideways adjacent the bottom of the platform, and a plurality of rows of rectangular flat top pontoons between pairs of said cleats having horizontal rim flanges slidable in said guideways in engagement with said planking.

6. A float as defined in claim 5 including bars in the ends of said guideways, each bar underlying a pontoon flange at one side of the platform and extending transversely between said cleats with the ends of the bar secured in said guideways to retain said pontoons in said guideways.

7. A marine float comprising deck planking, spaced parallel cleats on the bottom of said planking, a plurality of rows of rectangular flat top pontoons between pairs of said cleats having rim flanges secured against the bottom of said planking by said cleats, metal plates in said cleats, and screws through said planking having threaded engagement with said plates.

8. A marine float comprising a platform, a plurality of spaced parallel cleats on the bottom of said platform, and a plurality of rows of rectangular flat top pontoons between pairs of said cleats secured to the bottom of said platform by said cleats, said platform comprising an under layer of planking resting on said pontoons and a deck layer of planking on said under layer, said deck planking being spaced edge from edge and running parallel with said under planking in overlying relation with the joints in the under planking, screws in said cleats passing through said under planks and between said deck planks, and washers on said screws overlapping said deck planks.

9. A marine float comprising a deck platform and a plurality of rectangular flat top pontoons secured against the bottom of said platform, there being a sufficient number of said pontoons that the loss of buoyancy of one pontoon will not critically disturb the equilibrium of the float, each pontoon comprising an empty shell having a flat bottom and sloping sides and ends for nesting, said shell having an integral rim flange for supporting said platform and affording means of attachment thereto.

10. A marine float comprising a deck platform, cleats extending along opposite sides of the bottom of said platform in parallel relation, parallel cleats on the bottom of said platform at intervals between said first cleats, and a row of rectangular flat top pontoons between each pair of cleats, each pontoon comprising a nestable shell having a flat bottom and sloping sides and ends, said shell having an integral rim flange engaged by said cleats.

11. A marine float comprising a platform of wood planking, a plurality of identical rectangular pontoons supporting said platform, said pontoons being disposed in closely adjacent side by side relationship under substantially the whole area of said platform in sufficient number that the loss of buoyancy of one pontoon will not critically disturb the equilibrium of the float, each of said pontoons comprising a flat bottom and open top shell with sloping side and end walls for nesting of said shells, horizontal outstanding integral rim flanges on said shells, a flat cover sealed on said flanges to form with said shell a hollow water-tight flotation chamber, and means for securing said pontoons to the underside of said platform.

References Cited in the file of this patent

UNITED STATES PATENTS

| | | |
|---|---|---|
| 820,974 | Hilpert | May 22, 1906 |
| 1,205,667 | Rubenstein | Nov. 21, 1916 |
| 1,569,916 | Fisher et al. | Jan. 19, 1926 |
| 1,700,153 | Bradley | Jan. 29, 1929 |
| 2,008,136 | Gonyer | July 16, 1935 |
| 2,446,860 | Wallace | Aug. 10, 1948 |
| 2,582,228 | Brinkema | Jan. 15, 1952 |
| 2,662,248 | Ames | Dec. 15, 1953 |
| 2,746,257 | O'Brien | May 22, 1956 |

FOREIGN PATENTS

| | | |
|---|---|---|
| 116,275 | Australia | Dec. 24, 1942 |
| 683,638 | France | Mar. 4, 1930 |